United States Patent [19]

Krishnan et al.

[11] Patent Number: 5,500,465
[45] Date of Patent: Mar. 19, 1996

[54] BIODEGRADABLE MULTI-COMPONENT POLYMERIC MATERIALS BASED ON UNMODIFIED STARCH-LIKE POLYSACCHARIDES

[75] Inventors: Mohan Krishnan; Ramani Narayan, both of Okemos, Mich.

[73] Assignee: Board of Trustees operating Michigan State University, East Lansing, Mich.

[21] Appl. No.: 208,563

[22] Filed: Mar. 10, 1994

[51] Int. Cl.⁶ .................. C08L 3/04; C08L 67/04
[52] U.S. Cl. .............. 524/47; 523/124; 523/128; 523/509; 523/511; 525/412; 525/415; 524/35
[58] Field of Search ................. 524/47; 523/124, 523/128, 509, 511; 525/415, 412

[56] References Cited

U.S. PATENT DOCUMENTS

| | | | |
|---|---|---|---|
| 3,312,641 | 4/1967 | Young | 524/47 |
| 3,949,145 | 4/1976 | Otey et al. | 523/128 |
| 4,133,784 | 1/1979 | Otey et al. | 523/128 |
| 4,337,181 | 6/1982 | Otey et al. | 523/128 |

FOREIGN PATENT DOCUMENTS

| | | |
|---|---|---|
| 838572 | 10/1972 | Canada . |
| 282451 | 9/1988 | European Pat. Off. . |
| 304401 | 2/1989 | European Pat. Off. . |
| 327505 | 8/1989 | European Pat. Off. . |
| 400531 | 12/1990 | European Pat. Off. . |
| 404728 | 12/1990 | European Pat. Off. . |
| 404723 | 12/1990 | European Pat. Off. . |
| 408503 | 1/1991 | European Pat. Off. . |
| 0157643 | 12/1980 | Japan ................ 523/124 |
| 9005161 | 5/1990 | WIPO . |
| 9014388 | 11/1990 | WIPO . |
| 9219680 | 5/1992 | WIPO . |
| 9300399 | 1/1993 | WIPO . |
| 9300116 | 1/1993 | WIPO . |

OTHER PUBLICATIONS

Grant & Hackh's Chemical Dictionary, McGraw-Hill, 1987, p. 550.
Shogren, R. L., Fanta, G. F. and Doane, W. M. Development of Starch Based Plastics—a Reexamination of Selected Polymer Systems in Historical Perspective 45, 276–280 (1993).

Primary Examiner—Paul R. Michl
Assistant Examiner—Andrew E. C. Merriam
Attorney, Agent, or Firm—Ian C. McLeod

[57] ABSTRACT

Compatibilized blends of a biodegradable hydrophobic polyester, unmodified starch or other similar polysaccharide containing less than 1% water by weight, other biodegradable polymers that may be hydrophobic, plasticizer, and other additives. The blends are produced in the absence of water. The preferred polyester polymer is poly(ε-caprolactone) and the preferred starch is from corn. A small amount of a unique stretching agent is incorporated to provide high elongations at break, especially in film forming compositions containing a significant amount of starch. The starch is a discontinuous phase that may be completely or partially plasticized and the polyester polymer is the continuous phase. The preferred polymers have unique film forming properties and are resistant to water and moisture.

47 Claims, 1 Drawing Sheet

BIODEGRADABLE MULTI-COMPONENT POLYMERIC MATERIALS BASED ON UNMODIFIED STARCH-LIKE POLYSACCHARIDES

BACKGROUND OF THE INVENTION

1. Field of the Invention

The present invention relates to blends of dried, unmodified starch-like polysaccharides with hydrophobic polymers to produce durable, cost-effective materials that can be used as biodegradable moldings or films. Specifically, this invention relates to compatibilized blends of two or more components including dried, unmodified starch, plasticizer, and other biodegradable polymers for film applications. The processing conditions and formulations are so chosen as to form a blend with the hydrophobic polymer as the continuous phase, in order that the mechanical properties of the final blend approach that of the polymer and not the starch (which has considerably poorer melt and mechanical properties). However, a substantial amount of starch is incorporated in the blend composition to make it an economically viable product.

2. Prior Work Related to the Invention

In the last two decades, considerable effort has gone into the development of biodegradable polymers and blends using starch. The processing characteristics and mechanical properties of unmodified starch polymers are very poor compared to typical synthetic polymers.

The prior work in the area of biodegradable materials from starch involve the use of an external plasticizer to solvate the starch granules and impart melt processability and enhance the room-temperature flexibility of the final product. Some of the earliest efforts on such materials were discussed in U.S. Pat. No. 3,312,641 (A. E. Staley Mfg. Co.) and Canadian Patent Appl. No. 838,572 (USDA, Lincoln, Nebr.). The subject of these patents was the extrusion of amylose primarily using water as a plasticizer. In addition, poly(vinyl alcohol), glycerol and other related materials were also incorporated in the system. Cast films from water-based dispersions of starch, glycerol and other polymers were evaluated in U.S. Pat. Nos. 3,949,145, 4,133,784, and 4,337,181 (USDA, Peoria, Ill.). More recently, extruded compositions using water were discussed in Eur. Pat. Appl. EP 282,451, 304,401, 327,505, 404,723, 404,728, and 408, 503 (Warner Lambert Co.); water-free systems using glycerol were discussed in PCT Int. Appl. WO 90/05,161 (Tomka); and formulations using both water and other plasticizers like glycerol were the subject of PCT Int. Appl. WO 92/19680 (Novamont S.p.a.), Eur. Pat. Appl. EP 400, 531 (Butterfly S.r.l.), and PCT Int. Appl. WO 90/14,388 (Agri-Tech Industries, Inc.).

WO92/19680 (Novamont) describes the use of undried starch (about 12% moisture) in biodegradable polymeric compositions related to this invention. These compositions produce films whose properties are sensitive to moisture. W093/00116 (P&G) describes plastic compositions which use "destructurized" starch, a form where the crystallinity of the starch has been destroyed by heating. The term "destructurized starch" refers to starch in which the granular, crystalline structure is destroyed resulting in the formation of a homogeneous, amorphous material that melts and flows like a thermoplastic. The "destructurization" process is accomplished by heating starch granules in the presence of water at elevated temperatures and pressures in a closed volume like an extruder. The higher the amount of water used, the lower the temperature needed for "destructurization" to be completed. Typical compositions for the "destructurization" process includes extruding starch with about 15–20% water by weight along with other additives. It has been argued that the concept of "destructurization" is just a new name ascribed to an old concept of gelatinization and/or plasticization of starch that first originated in the food industry. The term gelatinization refers to the process of disruption of the granular structure of starch by heating a starch suspension at temperatures in the range of 50°–80° C. Traditional processing in the food industry involves further heating and mixing of starches to result in the formation of a homogeneous plasticized mass as discussed by Shogren, R. L., et al., Starch/Stärke 45, 276–280 (1993). The plasticization of starch using water and glycerol has been reported as early as 1947 for pharmaceutical applications ("The Pharmacopoeia of the United States of America", XIII, p. 513–514, 1947). The principal difference between the various applications has to do with the ratios of starch and plasticizer (water, glycerol or both) used in the composition. This leads to differences in the rheological and final characteristics of each composition that is suited to the specific application. A high proportion of plasticizer (70–90% by weight) results in a jelly-like material. Medium plasticizer contents (40–70% by weight) are more suited for food applications that have good elasticity combined with reasonable rigidity to be able to form and shape various products. Low plasticizer contents (10–40% by weight) are appropriate for plastics applications that require greater rigidity and better mechanical strength characteristics. More recently, plasticization of starch in the absence of water, using polyhydric alcohols like glycerol and sorbitol have been reported. The term plasticization in the classical sense as used in the polymer industry involves transformation of a rigid, crystalline material into a pliable, less crystalline (if not amorphous) material with a lowered glass transition temperature. Japanese Patent No. 04-48,851 discloses the manufacture of biodegradable sheets based upon mixtures of starch and biodegradable polyesters derived from reactions of diols and acids. The starch has normal moisture content of about 10 to 12% by weight.

In a typical plasticized system with starch, the diffusion of plasticizer out of the product when exposed to low humidity conditions and diffusion of water into the product under high humidity conditions is an inevitable result. This causes embrittlement of the product due to loss of plasticizer (low humidity) and problems associated with retention of product shape, texture, and form due to excess absorbed water (high humidity). These effects are detrimental specially when water is used as a plasticizer, but are prevalent even in non-water based starch formulations that incorporate hygroscopic plasticizers. In general, due to the poor durability of plasticized starch upon exposure to different environments (due to its hydrophilic nature) there is likely to be very little commercial use of plasticized native or unmodified starch by itself.

Physical or chemical modifications of the starch is a viable alternative to solving some of these problems. Physical modifications include coating the starch granules with hydrophobic sizing agents and binders similar to those used in the paper industry, like rosin, proteins, like soy proteins and silanes or physically coating the end product with hydrophobic materials like low molecular weight waxes, and natural resins (zein, rosin, shellac etc.) and higher molecular weight non-polar polymers. Cross-linking of the starch granules or plasticized starch is another physical modification route to improving the hydrophobicity of starch-based materials. Chemical modifications include grafting reactions and non-degradative substitution of the hydroxyls on the starch with functional groups like esters, ethers, isocyanates and the like. A simpler, cost-effective approach would be the formulation of compatibilized blends of plasticized unmodified starch with other polymers to incorporate properties of the individual components in the blend material. However, in unmodified starch-based blends good water resistance and durability in various environments cannot be achieved as long as the starch is the continuous phase in the blend morphology and a significant amount of a plasticizer is present.

OBJECTS

It is therefore an object of the present invention to provide novel compositions with good water resistance and durability under various humidities, based on unmodified starch and a biodegradable, hydrophobic polymer. Further, it is an object of the present invention to provide compositions which are useful for forming various objects and particularly films with high elongations at break and reasonable strength characteristics such as for compostable bags. Further, it is an object of the present invention to provide these compositions that retain their high elongations at very low humidities, unlike prior art products. Further still, it is an object of the invention to provide the said compositions with a final starch content of at least 25% by weight of the total. Finally, it is an object of the present invention to provide compositions which are relatively simple and economical to produce on conventional plastics processing equipment, with minimal equipment modifications, if any. These and other objects will become increasingly apparent by reference to the following description and the drawings.

DESCRIPTION OF PREFERRED EMBODIMENTS

Figure 1:
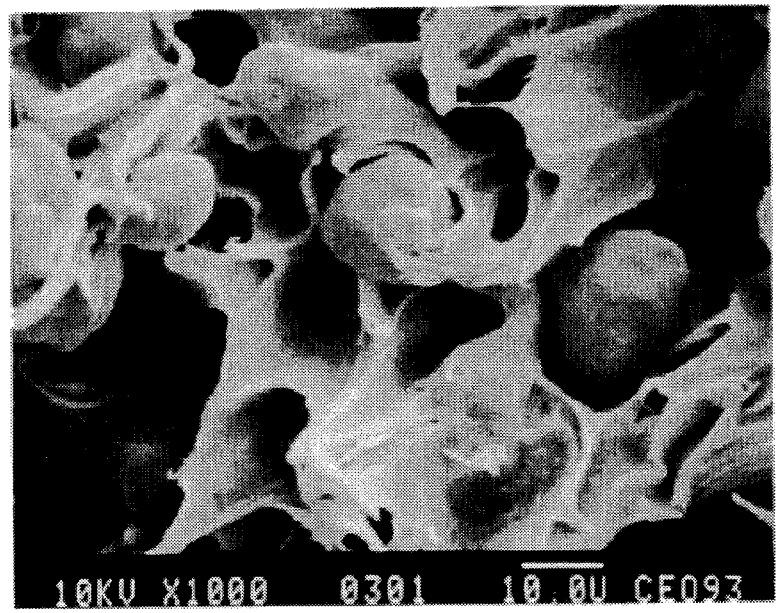
FIG. 1 is a scanning electron microscope (SEM) photomicrograph of a starch—poly(ε-caprolactone) blend as set forth in Example 2.

The present invention relates to a biodegradable composition comprising a blend of an unmodified starch, plasticizer, a biodegradable, hydrophobic aliphatic polyester, (also optionally including one or more other biodegradable polymers that may be hydrophobic) and other additives conventionally used in plastics, in minor proportions, wherein the starch is dried to an available moisture content of less than 1% by weight, wherein the starch is partially or completely plasticized, and wherein the starch phase is dispersed in a continuous matrix of the polyester. Further, the present invention relates to a method for preparing the biodegradable compositions, said process being: admixing the components in the absence of water at elevated temperatures, wherein any of the conventional melt processing methods used in the polymer industry may be employed, i.e., batch mixing, extrusion, injection molding, blow molding, compression molding, thermoforming, profile extrusion, flat-die film extrusion, blown film extrusion, and co-extrusion.

The present invention particularly relates to a composition comprising a blend of an unmodified starch-like polysaccharide containing less than about 1 percent by weight water, a plasticizer for the starch, a biodegradable hydrophobic aliphatic polyester (and optionally other biodegradable polymers), which has been blended in the absence of water at elevated temperatures and wherein the polysaccharide is a dispersed phase in the polyester polymer as the continuous phase and is 25 to 60% by weight of the composition.

Further, the present invention also particularly relates to a method for preparing a biodegradable polymer composition which comprises: admixing a starch-like polysaccharide having an available water content of less than about 1% by weight with an aliphatic polyester containing formulation, in the absence of water to form the biodegradable polymer composition, wherein the starch is a dispersed phase in the polyester polymer and is between about 25% and 60% by weight of the composition.

The preferred embodiment of this invention is blends of unmodified starch and a biodegradable hydrophobic polyester, preferably poly(ε-caprolactone). The good mechanical properties, hydrophobicity, and processability of the polyester is coupled with the low cost and higher use temperature of the starch component to form a low-cost, durable material with reasonable mechanical properties for film applications. The compositions in accordance with this invention are unique in that it is possible to process and make films containing at least 25% by weight of starch and at least 45% by weight of starch and plasticizer, with respect to the total composition, wherein such films exhibit reasonable strength, high elongations, good durability and retention of properties under different humidities. Typical compositions for film applications are about 11 to 19% by weight of starch with respect to the total composition in the case of the Novamont patent and less than 20% by weight of starch with respect to the total, in the case of the P&G patent.

The underlying reason for this ability of the present invention to incorporate a higher amount of starch and still make processable films is the use of dry unmodified starch and the absence of any added water whatsoever. The good elongation characteristics of such compositions with the higher amount of unmodified starch is attributed to the use of a unique additive discussed hereinafter. The overall effect of the use of the higher amount of unmodified starch in the blend composition is favorable economics due to the lower cost of starch and better thermal stability. The latter has to do with the low melting point of poly(ε-caprolactone) of about 60° C., which narrows the usable temperature range for the pure polyester. However, a blend composition containing higher amount of starch (and hence a lower amount of poly(ε-caprolactone)) can be expected to have better thermal stability.

Blends with two phases can be generated with a variety of morphologies that ultimately affect the properties of the blend. Typical morphologies observed in polymer blend systems are as follows: Dispersed arrangement; Layered arrangement; and Co-continuous or inter-penetrating network structure.

In a dispersed arrangement, one phase is dispersed in a matrix of the second phase. In such a system, the matrix phase properties typically dominate the properties of the blend. Such a morphology can be generated by extrusion compounding or other solution processing methods. The dispersed phase geometry can be droplets or fibrillar and the nature of this and the size distribution of the dispersed phase is determined by the interfacial tension between the components and the viscosity ratios at the processing conditions. The factors that determine which of the components form the continuous phase (in a melt-blended product) depends primarily on composition and melt viscosity ratios.

A layered arrangement or parallel arrangement is a non-isotropic structure in which both the components contribute towards blend properties. Co-extruded blends are examples of such arrangements.

If both the polymer components form a co-continuous phase network structure, the properties of the blend tend to be spatially isotropic and both the components contribute towards the final properties of the blend. Melt extrusion of the two components with control of the rheology can lead to formation of such structures.

In accordance with the present invention, a dispersed phase structure of the blend components with the starch phase being the dispersed phase can be generated by melt compounding in the extruder. For a composition of the blend with the starch being the minor component and the biodegradable polymer and the plasticizer being the major components, a two-phase morphology with the starch phase being the dispersed phase affords an optimum balance of mechanical properties, water resistance, product cost, and processability.

The present invention includes blend components materials as follows:

A. a starch or polysaccharides composed of linear and branched polymers of alpha-D-glucopyranosyl units in the range of 25 to 60%, preferably 30% to 45%, by weight (dry to less than 1% moisture by weight) based on the total composition, and B. a hydrophobic biodegradable component, such as an aliphatic polyester or a starch ester, in the range of 35 to 90% by weight based on the total composition wherein the amount of polyester is greater than the amount of starch, and C. optionally other graft or block copolymers to function as compatibilizers to enhance the interfacial adhesion, and D. a monomeric or polymeric plasticizer, other than water, composed of polar groups like —OH, —NH, —NH$_2$, and —Cl that has a boiling point appreciably greater than the processing temperature, in the range of 5 to 50% by weight based on the total composition, and E. most preferably a polyhydric fatty acid ester to allow the composition to be stretched to high elongations before failure, referred to herein as a "stretching agent". Most preferably, a polyglycerol fatty acid ester is used. The amount used is between 0.5 and 5% by weight of the total composition, and F. optionally peroxide initiators to cross-link the polyester and improve melt strength, in the amount of 0.01 to 1 part of peroxide per hundred parts of the polyester, and G. optionally colorants and other additives employed both in the plastics industry and the food industry, including anti-block and slip additives that prevent tackiness in the formed product like waxes and metal oxides, binders, lubricants, viscosity modifiers, flame retardants, processing aids and the like, in the range of 0.1 to 5 parts by weight based on 100 parts of the first four components A, B, C, and D.

H. The composition can contain fillers, preferably in an amount up to 10% by weight of the composition.

Polysaccharides, particularly starches, used in this invention are materials composed of amylose and amylopectin, i.e., linear and branched polymers of alpha-D-glucopyranosyl units, respectively, and are referred to hereinafter as "starch-like polysaccharides". The sources of such starches are rice, corn, potato, maize, tapioca, wheat, oats and many others. It is preferred that the starch used in this invention be derived from corn in view of its abundance and low cost. The amylose content of the starch is preferably at least 95% by weight.

It is important that the starches used be dried to an equilibrium moisture content of less than 1 percent by weight, preferably between about 0.5 and 1.0 percent water. The starch should be maintained in a dry state until use.

The amount of starch in the final blend composition lies in the range of 25–60% by weight and more preferably in the range of 30–45% by weight for an optimum balance of processability, mechanical properties, water resistance, product cost, and biodegradability. The amount of the starch is less than the amount of the polyester so that the starch is the dispersed phase.

The choice of the type and amount of the second component is based on biodegradability, compatibility considerations, molecular weight, melt viscosity, cost, mechanical properties, processability, and hydrophobicity. The more important amongst these are biodegradability, hydrophobicity, melt viscosity, mechanical properties and compatibility considerations.

In accordance with the invention, the hydrophobic second component of the blend is selected from the various class of polymers listed below:

A. One or more of the following aliphatic polymers—poly($\epsilon$-caprolactone), polyorthoesters, polymers and copolymers of hydroxybutyrate and hydroxyvalerate, poly(alkylene d-tartrate), and polymers and copolymers based on poly(glycolic acid) and poly(L-lactic acid). This second non-starch component of the blend also includes mixtures of one or more of the above mentioned polyesters with biodegradable vinyl polymers like poly(vinyl alcohol), poly(vinyl acetate), ethylene-vinyl acetate copolymer, cellulosics like cellulose acetate, cellulose butyrate, and cellulose propionate and polysaccharides like starch esters (starch octenyl succinates) and amylose esters that may be hydrophobic. The poly($\epsilon$-caprolactone) preferably has a molecular weight of at least about 40,000.

B. Copolymers of any of the polymers described above in A, with the following monomers, are within the scope of the invention:
maleic anhydride
stearic anhydride
acrylic acid
aliphatic or aromatic isocyanates
ethylene oxide
epichlorohydrin C. Additionally, the copolymers from the following group are within the scope of this invention as a minor, blend component, comprising less than 5% by weight of the total blend composition:

Styrene based copolymers such as, poly (styrene-co-maleic anhydride); poly (styrene-co-acrylonitrile); poly (styrene-co-acrylonitrile-co-acrylate); poly(styrene-co-allyl alcohol); and poly(acrylonitrile-co-butadiene-co-styrene).

Ethylene based copolymers such as, poly(ethylene-co-maleic acid); poly(ethylene-co-maleic anhydride); poly(ethylene-co-acrylic acid); and poly (ethylene-co-(N-n-octadecylmaleamic acid)).

Vinyl chloride and vinylidene chloride based copolymers such as poly(vinyl chloride-co vinyl acetate); poly(vinyl chloride-co-vinyl propionate); poly(vinyl chloride-co-vinyl acetate-co-vinyl alcohol); poly(vinyl chlorideco-vinylidene chloride-co-acrylic acid ester); and poly(vinyl chloride-co vinyl acetate-co-maleic acid).

Miscellaneous copolymers such as, starch-co-acrylamide, starch-co-acrylonitrile, nylon 2-coglycine, dextran-co-acrylamide, poly(epichlorohydrin-co-ethylene oxide), and poly(methyl vinyl ether-comaleic anhydride).

Interfacial adhesion between blend components is an important factor in determining the processing characteristics and final properties of the blend. Incompatibility between the blend components leads to poor interfacial adhesion, resulting in grossly phase separated morphologies with poor properties. The compatibility between blend components can be improved by use of suitable copolymers classified as "compatibilizers". The role of the "compatibilizer" is to localize at the interface between the components and promote interfacial bonding and good stress transfer. Typical "compatibilizers" are block or graft copolymers of type A-B, wherein, "A" is miscible with one of the blend components and "B" is miscible or can react with the second blend component. In accordance with this invention, copolymers listed above in headings B and C can function as "compatibilizers" for the blend system that is within the scope of this invention.

It is preferred that the hydrophobic component of the said blend comprises essentially of poly($\epsilon$-caprolactone) and one or more biodegradable polymers selected from amongst cellulose acetate, poly(vinyl alcohol), starch and amylose esters that may be hydrophobic, and copolymers of these with maleic anhydride. These additional polymers can be used in amounts of at least 1% by weight and up to about 5% by weight of the composition.

It is further preferred that the hydrophobic component which is in accordance with this invention be poly($\epsilon$-caprolactone). It is a biodegradable, hydrophobic polymer that is adequately compatible with starch in the final blend composition, resulting in good mechanical properties. It is a good film-forming material with mechanical properties similar to polyethylene, though somewhat stiffer. The resin is available in low melt flow (higher viscosity) and high melt flow (lower viscosity) grades. It is preferred that the higher molecular weight grade be chosen as the polyester of choice.

The amount of such a polymer in the final blend is preferably in the range from 35 to 90% by weight. A preferred amount of the poly($\epsilon$-caprolactone) is in the range of 35 to 60% by weight; wherein the amount of poly($\epsilon$-caprolactone) is greater than the amount of the starch in the final composition.

It is further preferred that the non-starch component of the blend also include a "compatibilizer" to enhance mechanical properties of the blend. Poly($\epsilon$-caprolactone-co-maleic anhydride), nylon 2-co-glycine, poly($\epsilon$-caprolactone)a copolymer of poly($\epsilon$-caprolactone) and maleic anhydride and dextran-co-acrylamide, starch-co-acrylamide and starch-co-acrylonitrile are the preferred polymers, within the scope of the invention. These polymers are either generated in situ, separately synthesized, or commercially obtained. The amount of such a polymer in the final blend composition is within the range of at least about 0.05% by weight, preferably 0.05 to 5% by weight, based on the total composition.

Figure 2:
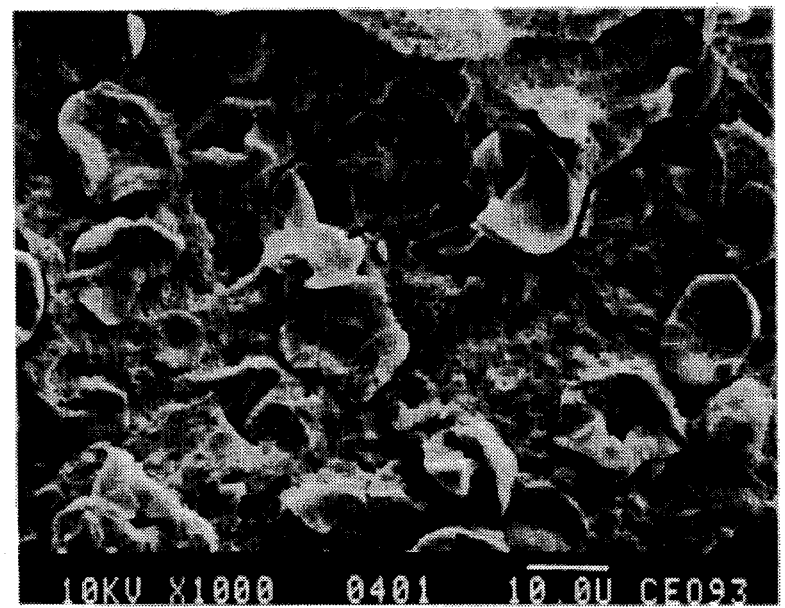
FIG. 2 is a SEM photomicrograph of a compatibilized starch—poly(ε-caprolactone) blend as shown in Example 5.

A scanning electron microscope (SEM) image of a blend using poly($\epsilon$-caprolactone-co-maleic anhydride) as the compatibilizer" is shown in FIG. 2 (Example 5). A SEM image of a similar blend without the "compatibilizer" is shown in FIG. 1 (Example 2). The latter blend exhibits poor bonding between the starch and the polyester phase as shown by the loosely held starch granules in a matrix of the polyester polymer. In the case of the compatibilized blend, the starch phase is bound well to the matrix leading to good structural integrity and mechanical strength characteristics.

Organic plasticizers for the composition that is in the scope of this invention are well known in the art as can be seen from the patents discussed previously. Typical non-aqueous plasticizers are dihydric, trihydric, polyhydric alcohols, and their derivatives. Some examples are ethylene glycol, propylene glycol, glycerol, glycerol esters, erythritol, pentaerythritol, and sorbitol. Glycerol esters include glycerol monoacetate, diacetate, and triacetate.

Plasticizers for the components described in heading A above like poly(vinyl alcohol), cellulosics, and polysaccharides are also included within the scope of the invention. Such plasticizers are those listed in the preceding paragraph and others including phthalic acid derivatives like diethyl phthalate, dimethyl phthalate, and dioctyl phthalate, phosphoric acid derivatives like triethyl phosphate, tributyl phosphate, and trioctyl phosphate.

For the purpose of this invention, it is preferred that the plasticizers chosen have a boiling point sufficiently higher than the processing temperature in the extruder and be thermally stable. The preferred plasticizers are glycerol, sorbitol, and mixtures thereof. It is further preferred that the plasticizer be glycerol, without any added water whatsoever.

It is preferred that the amount of the plasticizer be in the range of 5 to 50% by weight of the total composition. An amount of 5 to 30% by weight of the total is further preferred. It is essential that there be no excess glycerol in the formulation, since the phase-separated glycerol leaches out of the sample when exposed to high humidities, and causes problems with tackiness and poor texture.

As another embodiment of the present invention, there is provided a process for the formulation of said biodegradable thermoplastic blends based on a starch-like polysaccharide, said process being: blending said polysaccharide that is essentially free of moisture with a plasticizer and a hydrophobic polyester; wherein the blending preferably is done in a conventional twin-screw extruder at appropriate screw speeds and temperatures as to cause the polyester to form the continuous phase in the blend morphology.

The actual process for the formulation of the blend compositions outlined in this invention involves blending of the components in the twin-screw extruder to obtain a compatible, homogenized material that is pelletized for subsequent processing. The starch is dried to a moisture content of less than 1% by weight. The temperature of blending is in the range of 130° to 180° C., preferably in the range of 140° to 180° C. The blend formulations and the screw speed is chosen such that the blend morphology is one in which the poly($\epsilon$-caprolactone) forms the continuous phase.

One of the objectives of the invention is to formulate blend compositions that can be readily processed into films by either of the two common methods employed in the plastics industry, namely flat-die extrusion and blown film extrusion. For use as a material for film applications it is essential that the melt be highly extensible, not only for ease of processing but also for control of the mechanical properties of the final product. In the blown film process, the melt exits via a tubular die of a certain wall thickness (D) and is blown to form a bubble with a reduced wall thickness (d). This ratio D/d is called the draw-down ratio and for film-forming operations typically ranges from about 10 to 30, depending on the material and the ultimate film thickness required. In the flat-die extrusion process, the melt exits from a slit of rectangular cross-section and is drawn down to a reduced thickness on to a chill roll which rotates at a certain speed to control ultimate film thickness. In both these processes, it is essential to have high draw-down ratios at high speeds, for ease of processing. The draw-down ratio is directly dependent on the melt strength and melt elasticity, with a higher draw-down ratio resulting from a material with a higher melt strength and elasticity. The draw-down ratio of the blend is considerably improved when the poly(ε-caprolactone) forms the continuous phase. The presence of water is deleterious to achieving good draw-down. This is due to hydrolysis/interchange reactions that could take place between the hydroxyls and the carbonyl group of the poly(ε-caprolactone). These reactions tend to cleave the polymer chains resulting in lower molecular weights and a concomitant reduction in melt elongation and strength. By the same token, some level of interaction between the carbonyl of poly(ε-caprolactone) and the hydroxyls from both the added glycerol and starch molecules serves to influence the compatibility of the blend components, promoting greater interfacial adhesion. However, the effect of glycerol on the melt extensibility is minimal, if any. The presence of water in amounts greater than one percent is detrimental since the effect of reduced melt elongations is greater than the enhancement of interfacial adhesion.

Further, poly(ε-caprolactone) may be melt-crosslinked by the use of peroxides to improve the melt strength of the blend. The use of peroxides to cross-link polyethylene and poly(ε-caprolactone) is well known in the industry. Peroxides such as 2,5-dimethyl-2,5-di(t-butyl peroxy) hexane, benzoyl peroxide, dicumyl peroxide, and t-butyl peroxide are typically used for grafting reactions and crosslinking reactions.

It is preferred that the peroxide of choice for the purposes of this invention be 2,5-dimethyl-2,5-di(t-butyl peroxy) hexane. The amount of peroxide needed for cross-linking poly(ε-caprolactone) ranges from 0.01 to 1 part of peroxide per hundred parts of the polyester. It is further preferred that the amount of peroxide used be in the range of 0.01 to 0.5 part of peroxide per hundred parts of the polyester.

The blend materials may contain one or more of the following additives that are well known in the plastics industry. These include anti-block and slip additives that prevent tackiness in the formed product like fatty acids, fatty acid amides, and esters, waxes, fluorinated polymers, and metal oxides, lubricants, flame retardants, viscosity modifiers, processing aids and colorants. A special emphasis is placed on additives that function as binders by complexing with the starch. These specifically include proteins like soy proteins, whey proteins, and glutens, distilled monoglycerides like glycerol monostearate and glycerol monopalmitate, polymers like ethylene-acrylic acid, and mixtures thereof.

The preferred amounts of each of the above additives is in the range of 0.1 to 5 parts by weight based on 100 parts of starch, plasticizer, polyester and "compatibilizer" put together.

The preferred amount of the stretching agent is in the range of 0.5 and 5% by weight of the total.

A stretching agent which functioned to considerably improve the tensile elongation of the blend materials was decaglycerol tetraoleate. Blend compositions containing more than 35% of starch by weight and up to 50% of starch and glycerol by weight exhibit brittle failure in tension, with poor elongation at break. However, a similar composition containing decaglycerol tetraoleate added to the amount of just 1% by weight of the total resulted in a material that exhibited a yielding phenomenon with a high tensile elongation at break. It was believed that the decaglycerol tetraoleate functioned as a plasticizer for the poly(ε-caprolactone) by lowering its glass transition temperature ($T_g$), which would explain the stretching behavior. Dynamic Mechanical Analysis (DMA) is a technique used to explore such effects as it gives the glass transition temperatures of pure polymers and mixtures of polymers with other polymers or plasticizers. Typically, the $T_g$ of a plasticized polymer is lower than that of the unplasticized polymer. However, DMA results on mixtures of poly(ε-caprolactone) and decaglycerol tetraoleate do not indicate a lowered $T_g$ for poly(ε-caprolactone). So, the underlying reason behind the role of decaglycerol tetraoleate as a stretching agent is not obvious at this point.

As another embodiment of the present invention, there is provided a composition and method for the synthesis of poly(ε-caprolactone-co-maleic anhydride) described earlier, said composition involving poly(ε-caprolactone) and each of the following:

(a) maleic anhydride, in the amount of 1 to 5 parts per hundred parts of poly(ε-caprolactone) by weight, and (b) peroxides like benzoyl peroxide, 2,5-dimethyl-2,5-di(t-butyl peroxy) hexane, dicumyl peroxide, and t-butyl peroxide. It is preferred that the peroxide be 2,5-dimethyl-2,5-di(t-butyl peroxy) hexane, in the amount of 0.05 to 1 part per hundred parts of poly(ε-caprolactone) by weight.

The method for synthesizing the said copolymers of poly(ε-caprolactone) and maleic anhydride is reactive extrusion in an extruder; wherein the temperature of reaction is in the range of 150° to 200° C. and the screw speed of the extruder was in the range of 75 to 200 rpm.

The following non-limiting examples are used to further describe the invention and illustrate some of the highlights of the invention.

EXAMPLE 1

A composition containing 38% by weight of dry corn starch, 11% by weight of glycerol, 1% by weight of decaglycerol tetraoleate as the stretching agent, and 50% by weight of poly(ε-caprolactone) was compounded in a 30mm Baker-Perkins co-rotating, twin-screw extruder with a L/D of 13. The starch was dried in a forced convention oven at 100° C. to a moisture content of less than 1% by weight of the dried starch granules. The poly(ε-caprolactone) polymer was TONE 787 from Union Carbide (Danbury, Conn.).

The above composition was dry-blended and fed to the extruder. The processing conditions in the extruder were as follows:

Temperature:

Feed zone-140° C.

Melting and mixing zone-170° C.

Die-155° C.

Screw speed:

100 rpm

The extrudate in the form of strands was pelletized and stored in a desiccator for subsequent processing, as in film extrusion. The extrudate exhibited good melt extension and draw-down, which is a critical factor for film fabrication. The pellets were used in a Killion (Verona, N.J.) single screw extruder (L/D of 24:1) equipped with a flat film die to make films that were cooled on a set of chill rolls. It was possible to make films with a nominal thickness of about 3 mils. Strands and films of this composition exhibited reasonable strength and high elongation at room temperature, the latter being necessary for good tear properties for film applications. Pellets of the above composition retained their dimensions and textural qualities when immersed in water at room temperature for a week. Films of the above composition were stable, without swelling and minimal leaching of plasticizer upon exposure to high humidity (about 90% RH) conditions for a week. It was possible to obtain the above set of desirable properties only by making the poly(ε-caprolactone) to form the continuous phase in the blend morphology. Also, the product of above composition exhibited good aerobic biodegradability in municipal sewage sludge.

EXAMPLE 2

A composition containing 43% by weight of dry corn starch (moisture content of 1%), 11% by weight of glycerol as a plasticizer, 1% by weight of decaglycerol tetraoleate as a stretching agent, and 45% by weight of poly(ε-caprolactone) was compounded as described in Example 1. On account of the higher amount of starch used in this composition, the nominal film thickness that could be obtained was about 4 to 4.5 mils. All other characteristics were similar to the composition outlined in Example 1.

COMPARATIVE EXAMPLE 3

A composition containing 43% by weight of undried corn starch, 11% by weight of glycerol, 1% by weight of decaglycerol tetraoleate, and 45% by weight of poly(ε-caprolactone) was compounded in an extruder as described in Example 1. The starch was not dried and had an equilibrium moisture content of about 10% by weight. The poly(ε-caprolactone) polymer was Union Carbide's TONE 787.

The above composition was dry-blended and fed to the extruder. The processing conditions in the extruder were as outlined in Example 1. The extrudate in the form of strands was pelletized and stored in a desiccator for subsequent processing, as in film extrusion. The extrudate exhibited very poor melt extension and draw-down characteristics. This could be attributed to the interaction of water in the starch and the decaglycerol tetraoleate to form by-products that can cause chain scission of the polymers leading to reduced melt strength and extension.

EXAMPLE 4

A composition containing 44% by weight of dry corn starch (1.0% moisture), 11% by weight of glycerol, and 45% by weight of poly(ε-caprolactone) was compounded in an extruder as described in Example 1. The poly(ε-caprolactone) polymer was Union Carbide's TONE 787.

The above composition was dry-blended and fed to the extruder. The processing conditions in the extruder were as outlined in Example 1. The extrudate in the form of strands was pelletized and stored in a desiccator for subsequent processing, as in film extrusion. Strands and films of this composition exhibited a brittle failure without a high elongation at room temperature and thus was not preferred. Other characteristics of this composition was similar to that of Example 1.

EXAMPLE 5

A composition similar to that outlined in Example 2 was compounded using 43% by weight of poly(ε-caprolactone) and 2% by weight of poly(ε-caprolactone-co-maleic anhydride). The poly(ε-caprolactone) polymer was Union Carbide's TONE 787. Poly(ε-caprolactone-co-maleic anhydride) was synthesized by extrusion grafting of maleic anhydride in the presence of a peroxide initiator as described before. The composition was dry-blended and extruded under conditions described earlier. The extrudate in the form of strands was pelletized and stored in a dessicator for subsequent processing, as in injection molding. This composition exhibited a significant increase in tensile strength as compared to the composition without poly(ε-caprolactone-co-maleic anhydride). The copolymer functioned as a "compatibilizer" to improve the interfacial adhesion between the various phases of the blend, thereby increasing the strength properties.

EXAMPLE 6

The composition of this example was similar to Example 5 with the exception that the "compatibilizer" was generated in situ by extrusion grafting in a single step along with blend mixing. The results were similar.

EXAMPLE 7

The composition of this example was similar to Example 5 with the exception that styrene-co-maleic anhydride copolymer was used as the "compatibilizer" instead of poly(ε-caprolactone-co-maleic anhydride). The results were about the same.

As can be seen from the foregoing Examples and discussion, the effect of decaglycerol tetraoleate on the elongation of films that are in accordance with this invention is significant and unexpected. Secondly, the presence of water in the formulations is detrimental to achieving good draw-down characteristics for film processing. The detrimental effects of water is believed not to be significant when low amounts of starch is used (as in PCT Int. App. WO 92/19680 (Novamont S.p.a.) and PCT Int. Appl. WO 93/00116 (The Procter and Gamble Co.)). When higher amounts of starch are used, as in the compositions that are within the scope of this invention, the deleterious effects of water are unexpectedly circumvented by the use of dry starch and the absence of added water in the processing steps. Thirdly, the ability to graft maleic anhydride onto chains of poly(ε-caprolactone) to form the copolymer poly(ε-caprolactone-co-maleic anhydride) and the resultant effect of this copolymer on the mechanical properties of the blend material is another unique aspect of the invention.

It is intended that the foregoing description be only illustrative of the present invention and that the present invention be limited only by the hereinafter appended claims.

We claim:

1. A composition comprising a blend of an unmodified polysaccharide containing alpha-D-glucopyranosyl units containing less than about 1 percent by weight water, optionally a plasticizer for the polysaccharide, a biodegradable hydrophobic aliphatic polyester polymer, and optionally one or more other biodegradable polymers that may be hydrophobic, which has been blended in the absence of water at elevated temperatures, wherein the polysaccharide is a dispersed phase in the polyester polymer as the continuous phase and is 25 to 60% by weight of the composition and wherein an organic peroxide has been provided with the polyester polymer in an amount to provide improved melt strength as compared to the composition without the peroxide.

2. The composition of claim 1, wherein the composition is physically stable in liquid water and water vapor, as in high humidities, and exhibits decreased permeability to both water and water vapor.

3. The composition of claim 1, in which the polysaccharide is starch.

4. The composition of claim 1 in which the polysaccharide is starch which is selected from the group consisting of starches derived from rice, corn, potato, tapioca, wheat, oats and mixtures thereof.

5. The composition of claim 4 in which an amylose content of the starch is up to about 95% by weight.

6. The composition of claim 4 wherein the starch is from corn.

7. The composition of claim 2 in which the polysaccharide is starch which is present in plasticized or unplasticized form in an amount of at least 30% by weight of the composition.

8. The composition of claim 2 in which the polysaccharide is starch which is present in plasticized or unplasticized form in an amount of about 30 to 45% by weight of the composition.

9. The composition of claim 5 in which the polysaccharide is starch which is present in plasticized or unplasticized form in an amount between about 30 to 45% by weight of the composition.

10. The composition of claim 1 wherein the biodegradable, hydrophobic polyester polymer is selected from the group consisting of poly($\epsilon$-caprolactone), polymers, copolymers based on poly(glycolic acid) and poly(L-lactic acid), and a copolymer of these polymers with maleic anhydride or acrylic acid.

11. The composition of claim 1 wherein the composition contains in addition a biodegradable polymer selected from the group consisting of cellulose acetate, poly(vinyl alcohol) starch esters and amylose esters and optionally includes plasticizers.

12. The composition of claim 10, wherein the biodegradable hydrophobic polyester polymer is poly($\epsilon$-caprolactone).

13. The composition of claim 10, wherein the polymer is poly($\epsilon$-caprolactone-co-maleic anhydride) as a copolymer.

14. The composition of claim 10 wherein the polymer is a mixture of the poly($\epsilon$-caprolactone) polymer and poly($\epsilon$-caprolactone-co-maleic anhydride) as a copolymer.

15. The composition of claim 13 in which the poly($\epsilon$-caprolactone-co-maleic anhydride) as a copolymer is generated in situ by the peroxide.

16. The composition of claim 13 in which the poly($\epsilon$-caprolactone-co-maleic anhydride) as a copolymer is separately synthesized by a peroxide initiation and subsequently incorporated into the composition.

17. The composition of any one of claims 15 or 16 in which the peroxide used is 2,5-dimethyl-2,5-di(t-butyl peroxy)hexane, in the amount of 0.05 to 1 part of peroxide per hundred parts of the polyester polymer.

18. The composition of any one of claims 15 or 16, wherein an amount of maleic anhydride added is from about 1 to 5 parts per hundred parts of the poly($\epsilon$-caprolactone) by weight.

19. The composition of claims 12, 13 or 14 wherein the amount of poly($\epsilon$-caprolactone) in the composition is at least about 35% by weight.

20. The composition of claims 12, 13 or 14 wherein the amount of poly($\epsilon$-caprolactone) in the composition is about 35 to 60% by weight.

21. The composition of claim 14, wherein the amount of the poly($\epsilon$-caprolactone-co-maleic anhydride) as a copolymer in the composition is at least about 0.05% by weight.

22. The composition of claim 11 wherein the amount of additional biodegradable polymers in the composition is at least 1% by weight of the composition.

23. The composition of claim 1, wherein the plasticizer is selected from the group consisting of glycerol, sorbitol, glycerol monoacetate, glycerol diacetate, glycerol triacetate.

24. The composition of claim 23 wherein the plasticizer is at least about 5% by weight of the composition.

25. The composition of claim 23 wherein the plasticizer is between about 5 and 30% by weight of the composition.

26. The composition of claim 1 wherein a polyhydric fatty acid ester is provided in the composition as a stretching agent in amount between about 0.5 to 5% by weight of the composition.

27. The composition of claim 26 wherein the polyhydric fatty acid ester is a polyglycerol fatty acid ester.

28. The composition of claim 27 wherein the polyglycerol fatty acid ester is decaglycerol tetraoleate.

29. The composition according to claim 1, in which the said peroxide is selected from the group consisting of 2,5-dimethyl-2,5-di(t-butyl peroxy)hexane, benzoyl peroxide, and di-cumyl peroxide, in the amount of 0.01 to 0.5 part of peroxide per hundred parts of the polyester polymer.

30. The composition of claim 1, in which there are fillers in an amount of up to 10% by weight based on the composition.

31. The composition of claim 1, in which there are additives that function as binders selected from the group consisting of proteins, monoglycerides, ethyleneacrylic acid polymer and mixtures thereof and wherein the additives are present in a range of 0.1 to 5 percent by weight of the composition.

32. The composition of claim 1, in which there are added colorants and additives selected from the group consisting of fatty acids, fatty acid amides, and esters, waxes, fluorinated polymers, and metal oxides, lubricants, flame retardants, viscosity modifiers, wherein the additives are present in a range of 0.1 to 5 parts by weight based on 100 parts of the composition.

33. A method for preparing a biodegradable polymer composition which comprises: admixing a polysaccharide containing alpha-D-glucopyranosyl units having an available water content of less than about 1% by weight with an aliphatic polyester polymer containing formulation in the absence of water to form the biodegradable polymer composition, wherein the polysaccharide is a dispersed phase in the polyester polymer and is between about 25% and 60% by weight of the composition, and wherein an organic peroxide has been provided with the polyester polymer to provide improved melt strength as compared to the composition without the peroxide.

34. The method of claim 33 wherein the aliphatic polyester polymer is poly($\epsilon$-caprolactone).

35. The method of claim 33 wherein the aliphatic polyester polymer is poly($\epsilon$-caprolactone-co-maleic anhydride) as a copolymer.

36. The method of claim 33 wherein an organic plasticizer for the starch and the polyester polymer is included in the admixture.

37. The method of claim 36 wherein the plasticizer is present in an amount between about 5 and 50% by weight.

38. The method of claim 33 wherein the admixing is at a temperature of between about 130° and 180° C.

39. The method of claim 33 wherein a polyhydric fatty acid ester is provided in the composition as a stretching agent.

40. The method of claim 39 wherein the polyhydric fatty acid ester is a polyglycerol fatty acid ester.

41. The method of claim 40 wherein the polyglycerol fatty acid ester is decaglycerol tetraoleate.

42. A composition comprising a blend of an unmodified polysaccharide containing alpha-D-glucopyranosyl units containing less than about 1 percent by weight water, optionally a plasticizer for the polysaccharide, a biodegradable hydrophobic aliphatic polyester polymer, and optionally one or more other biodegradable polymers that may be hydrophobic, which has been blended in the absence of water at elevated temperatures wherein an organic peroxide has been provided with the polyester polymer in an amount to provide improved melt strength as compared to the composition without the peroxide, wherein the polysaccharide is a dispersed phase in the polyester polymer as the continuous phase and is 25 to 60% by weight of the composition, and wherein the polyester polymer is poly($\epsilon$-caprolactone-co-maleic anhydride) as a copolymer.

43. The composition of claim 42 wherein the polymer is a mixture of the poly($\epsilon$caprolactone-co-maleic anhydride) as the copolymer and poly($\epsilon$-caprolactone).

44. A method for preparing a biodegradable polymer composition which comprises: admixing a polysaccharide containing alpha-D-glucopyranosyl units having an available water content of less than about 1% by weight with an aliphatic polyester polymer containing formulation in the absence of water wherein an organic peroxide has been provided with the polyester polymer in an amount to provide improved melt strength as compared to the composition without the peroxide to form the biodegradable polymer composition, wherein the polysaccharide is a dispersed phase in the polyester polymer and is between about 25% and 60% by weight of the composition and wherein the aliphatic polyester is poly($\epsilon$-caprolactone-co-maleic anhydride) as a co-polymer.

45. The method of claim 44 wherein a polyhydric fatty acid ester is provided in the composition as a stretching agent.

46. The method of claim 45 wherein the polyhydric fatty acid ester is a polyglycerol fatty acid ester.

47. The method of claim 44 wherein the polyglycerol fatty acid ester is decaglycerol tetraoleate.

* * * * *